United States Patent
Wrigg et al.

(10) Patent No.: US 11,074,826 B2
(45) Date of Patent: Jul. 27, 2021

(54) FRAMEWORKS AND METHODOLOGIES CONFIGURED TO ENABLE REAL-TIME ADAPTIVE DELIVERY OF SKILLS TRAINING DATA BASED ON MONITORING OF USER PERFORMANCE VIA PERFORMANCE MONITORING HARDWARE

(71) Applicant: RLT IP Ltd., Gosport (GB)

(72) Inventors: Darren Wrigg, Sydney (AU); Stuart May, Sydney (AU)

(73) Assignee: RLT IP LTD, Gosport (GB)

( * ) Notice: Subject to any disclaimer, the term of this patent is extended or adjusted under 35 U.S.C. 154(b) by 317 days.

(21) Appl. No.: 16/060,586

(22) PCT Filed: Dec. 12, 2016

(86) PCT No.: PCT/AU2016/051220
§ 371 (c)(1),
(2) Date: Jun. 8, 2018

(87) PCT Pub. No.: WO2017/096436
PCT Pub. Date: Jun. 15, 2017

(65) Prior Publication Data
US 2019/0228672 A1    Jul. 25, 2019

(30) Foreign Application Priority Data

Dec. 10, 2015  (AU) ................................ 2015905108
Feb. 2, 2016   (WO) ................ PCT/AU2016/000020
Feb. 2, 2016   (WO) ................ PCT/AU2016/000026

(51) Int. Cl.
*G09B 9/00*     (2006.01)
*G09B 15/00*    (2006.01)
(Continued)

(52) U.S. Cl.
CPC ............ *G09B 9/00* (2013.01); *A63B 24/0006* (2013.01); *A63B 71/0622* (2013.01);
(Continued)

(58) Field of Classification Search
None
See application file for complete search history.

(56) References Cited

U.S. PATENT DOCUMENTS 6,293,802 B1   9/2001  Ahlgren
6,389,368 B1   5/2002  Hampton
(Continued)

FOREIGN PATENT DOCUMENTS

CN   101441776 A   5/2009
CN   101652808 A   2/2010
(Continued)

OTHER PUBLICATIONS

Extended European Search Report dated Mar. 29, 2019, European Patent Application No. 16871832.8, 7 pages.
(Continued)

*Primary Examiner* — Jason T Yen

(57) ABSTRACT

Described herein are to frameworks and methodologies configured to enable real-time adaptive delivery of skills training data based on monitoring of user performance data. Embodiments of the invention have been particularly to enable real-time control over a performance instruction user interface (for example in terms of rate), and/or control over delivery of media data (for example in terms of rate and/or pan/zoom position).

23 Claims, 14 Drawing Sheets

(51) Int. Cl.
  *G06K 9/00* (2006.01)
  *G09B 19/00* (2006.01)
  *G09B 15/02* (2006.01)
  *A63B 71/06* (2006.01)
  *G09B 5/06* (2006.01)
  *A63B 24/00* (2006.01)

(52) U.S. Cl.
  CPC ........... *G06K 9/00342* (2013.01); *G09B 5/06* (2013.01); *G09B 15/00* (2013.01); *G09B 15/002* (2013.01); *G09B 15/023* (2013.01); *G09B 19/00* (2013.01); *G09B 19/0038* (2013.01); *A63B 2024/0015* (2013.01); *A63B 2071/063* (2013.01)

(56) References Cited

U.S. PATENT DOCUMENTS

| | | | |
|---|---|---|---|
| 7,825,815 | B2 | 11/2010 | Shears et al. |
| 9,223,936 | B2 | 12/2015 | Aragones et al. |
| 9,886,871 | B1* | 2/2018 | Rauhala ................. G09B 19/00 |
| 10,216,893 | B2 | 2/2019 | Hong et al. |
| 2004/0133081 | A1* | 7/2004 | Teller ................... A61B 5/0205 600/300 |
| 2005/0196737 | A1 | 9/2005 | Mann |
| 2006/0025229 | A1 | 2/2006 | Mahajan et al. |
| 2006/0166737 | A1 | 7/2006 | Bentley |
| 2007/0063850 | A1 | 3/2007 | DeVaul et al. |
| 2008/0254946 | A1* | 10/2008 | Pauws ................ A63B 71/0686 482/8 |
| 2009/0311657 | A1 | 12/2009 | Dodelson et al. |
| 2010/0053867 | A1 | 3/2010 | Ellis et al. |
| 2010/0056876 | A1 | 3/2010 | Ellis et al. |
| 2010/0121227 | A1 | 5/2010 | Stirling et al. |
| 2010/0176952 | A1 | 7/2010 | Bajcsy et al. |
| 2010/0184563 | A1 | 7/2010 | Molyneux et al. |
| 2010/0283630 | A1 | 11/2010 | Alonso |
| 2011/0003638 | A1* | 1/2011 | Lee ..................... A63F 11/0051 463/35 |
| 2011/0153042 | A1 | 6/2011 | Burton et al. |
| 2011/0259176 | A1 | 10/2011 | Pillhofer et al. |
| 2011/0270135 | A1 | 11/2011 | Dooley et al. |
| 2012/0029666 | A1 | 2/2012 | Crowley et al. |
| 2012/0046901 | A1 | 2/2012 | Green et al. |
| 2012/0157263 | A1 | 6/2012 | Sivak et al. |
| 2012/0183940 | A1 | 7/2012 | Aragones et al. |
| 2013/0029791 | A1 | 1/2013 | Rose et al. |
| 2013/0040271 | A1* | 2/2013 | Rytky ................. G06F 19/3481 434/247 |
| 2013/0040763 | A1 | 2/2013 | Davidson |
| 2013/0203475 | A1 | 8/2013 | Kil et al. |
| 2013/0233152 | A1 | 9/2013 | Pillhofer et al. |
| 2013/0274587 | A1 | 10/2013 | Coza et al. |
| 2013/0330054 | A1 | 12/2013 | Lokshin |
| 2014/0100010 | A1 | 4/2014 | Lee et al. |
| 2014/0114453 | A1 | 4/2014 | Bentley |
| 2014/0142459 | A1 | 5/2014 | Jayalth et al. |
| 2014/0161322 | A1 | 6/2014 | Cheng et al. |
| 2014/0172134 | A1 | 6/2014 | Meschter |
| 2014/0174174 | A1 | 6/2014 | Uehara et al. |
| 2014/0235230 | A1 | 8/2014 | Raleigh |
| 2014/0257743 | A1 | 9/2014 | Lokshin et al. |
| 2014/0263224 | A1 | 9/2014 | Becker |
| 2014/0272838 | A1 | 9/2014 | Becker |
| 2014/0278139 | A1 | 9/2014 | Hong et al. |
| 2014/0320481 | A1 | 10/2014 | Vivi |
| 2014/0376876 | A1 | 12/2014 | Bentley et al. |
| 2015/0019135 | A1 | 1/2015 | Kacyvenski et al. |
| 2015/0044652 | A1 | 2/2015 | Humphrey et al. |
| 2015/0072326 | A1 | 3/2015 | Mauri et al. |
| 2015/0118658 | A1 | 4/2015 | Mayou et al. |
| 2015/0340066 | A1 | 11/2015 | Lokshin et al. |
| 2016/0077581 | A1 | 3/2016 | Shi |
| 2016/0180248 | A1 | 6/2016 | Regan |
| 2016/0256082 | A1* | 9/2016 | Ely ....................... A61B 5/0015 |
| 2016/0284228 | A1* | 9/2016 | McCarthy ............ G09B 15/003 |
| 2016/0330533 | A1 | 11/2016 | Mangaud |
| 2017/0061817 | A1 | 3/2017 | May |
| 2017/0076619 | A1* | 3/2017 | Wallach ............. G09B 19/0038 |
| 2017/0197111 | A1 | 7/2017 | Mak |
| 2018/0015345 | A1 | 1/2018 | Wrigg |
| 2018/0296878 | A1 | 10/2018 | Copelan et al. |
| 2019/0069154 | A1 | 2/2019 | Booth et al. |

FOREIGN PATENT DOCUMENTS

| | | |
|---|---|---|
| CN | 102819863 A | 12/2012 |
| CN | 103135765 A | 6/2013 |
| CN | 103990285 B | 2/2017 |
| CN | 104126184 B | 1/2018 |
| EP | 3205379 A1 | 8/2017 |
| JP | 2001246155 A | 9/2001 |
| JP | 2008073285 A | 4/2008 |
| JP | 2008528195 A | 7/2008 |
| JP | 2009169103 A | 7/2009 |
| JP | 2011150351 A | 8/2011 |
| JP | 2012120579 A | 6/2012 |
| JP | 2013503694 A | 2/2013 |
| JP | 2014512205 A | 5/2014 |
| WO | 2011086466 A1 | 7/2011 |
| WO | 2012020242 A2 | 2/2012 |
| WO | 2014121374 A1 | 8/2014 |

OTHER PUBLICATIONS

Communication pursuant to Article 94(3) EPC dated Oct. 14, 2019, European Patent Application No. 16871832.8, 4 pages.
CN 201680044207.6, "First Office Action," dated Apr. 15, 2019, 15 pages.
CN App. No. 201680020626.6, "Second Office Action," dated Jan. 19, 2020, 10 pages.
EP 16745983.3, "Article 94(3) 1st OA," dated Dec. 11, 2019, 6 pages.
EP 16791825.9, "Article 94(3) 1st OA," dated Dec. 11, 2019, 6 pages.
Extended European Search Report dated Jan. 21, 2019 from European Application No. 16798963.1, 7 pages.
Extended European Search Report dated Jun. 14, 2018 from European Application No. 16745989.0 filed Aug. 31, 2017, 7 pages.
Extended European Search Report dated Sep. 26, 2018 from European Application No. 16791825.9, 7 pages.
Extended European Search Report dated Sep. 26, 2018 from European Application No. 16791826.7, 8 pages.
Extended European Search Report dated Jun. 14, 2018 from European Application No. 16745983.3 filed Aug. 30, 2017, 7 pages.
First Office Action dated May 22, 2019 for Chinese Patent Application No. 201680020626.6, 10 pages.
First Office Action dated Mar. 29, 2019, Chinese Patent Application No. 201680021231.8, 13 pages.
International Search Report and Written Opinion dated Apr. 27, 2016 from International Application No. PCT/AU2016/000020 filed Feb. 2, 2016, 9 pages.
International Search Report and Written Opinion dated Jul. 11, 2016 from International Application No. PCT/AU2016/050415 filed May 27, 2016, 13 pages.
International Search Report and Written Opinion dated Jul. 4, 2016 from International Application No. PCT/AU2016/000026 filed Feb. 2, 2016, 15 pages.
International Search Report and Written Opinion dated Jun. 21, 2016 from International Application No. PCT/AU2016/050348 filed May 9, 2016, 26 pages.
International Search Report and Written Opinion dated Jun. 3, 2016 from International Application No. PCT/AU2016/050347 filed May 9, 2016, 14 pages.
CN 201680044207.6 Second Office Action dated Apr. 3, 2020, 9 pages.
JP 2018-509949, First Office Action, dated Apr. 21, 2020, 8 pages.

(56) References Cited

OTHER PUBLICATIONS

JP App No. 2017-558595, "First Office Action," dated Feb. 4, 2020, 12 pages.
JP App No. 2017-558596, "First Office Action," dated Feb. 4, 2020, 9 pages.
JP App No. 2017-561325, "First Office Action," dated May 26, 2020, 12 pages.
JP Application No. 2018-509948, "1st Office Action," dated Jun. 9. 2020, 14 pages.
International Search Report and Written Opinion dated Feb. 20, 2017 from International Application No. PCT/AU2016/051220 filed Dec. 12, 2016, 21 pages.
Anderson et al., "YouMove: Enhancing Movement Training with an Augmented Reality Mirror", UIST '13 Proceedings of the 26th Annual ACM Symposium on User Interface Software and Technology, St. Andrews, Scotland, United Kingdom, Oct. 8-11, 2013, pp. 311-320.
JP Application No. 2018-530155, "First Office Action," dated Jan. 5, 2021, 9 pages.

\* cited by examiner

FRAMEWORKS AND METHODOLOGIES CONFIGURED TO ENABLE REAL-TIME ADAPTIVE DELIVERY OF SKILLS TRAINING DATA BASED ON MONITORING OF USER PERFORMANCE VIA PERFORMANCE MONITORING HARDWARE

CROSS-REFERENCE TO RELATED APPLICATIONS

The present application is a § 371 application of International Application No. PCT/AU2016/051220 filed on Dec. 12, 2016 and titled "FRAMEWORK AND METHODOLOGIES CONFIGURED TO ENABLE REAL-TIME ADAPTIVE DELIVERY OF SKILLS TRAINING DATA BASED ON MONITORING OF USER PERFORMANCE VIA PERFORMANCE MONITORING HARDWARE," which claims the benefit of Australian Patent Application No. 2015905108 filed on Dec. 10, 2015, International Application No. PCT/AU2016/000020 filed on Feb. 2, 2016, and International Application No. PCT/AU2016/000026 filed on Feb. 2, 2016. International Application No. PCT/AU2016/051220, Australian Patent Application No. 2015905108, International Application No. PCT/AU2016/000020, and International Application No. PCT/AU2016/000026 are incorporated herein.

FIELD OF THE INVENTION

The present invention relates to frameworks and methodologies configured to enable real-time adaptive delivery of skills training data based on monitoring of user performance data, for example user performance data derived from performance monitoring hardware (such as motion sensors, vibration/sound sensors, and so on). Embodiments of the invention have been particularly developed to enable real-time control over a performance instruction user interface, for example to enable real-time training based on analysis of a physical performance. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Various technologies have been developed thereby to enable delivery of skills training content, with mechanisms to monitor user performances and provide feedback. A particular example is found in the field of musical instrument training; a software application delivers a scrolling instruction display, which provides a user with instructions for playing particular notes at a particular rate. The rate is adjustable via difficulty settings. A feedback mechanism is configured to provide a user with feedback based on accuracy in playing the instructed notes in the instructed manner.

SUMMARY OF THE INVENTION

It is an object of the present invention to overcome or ameliorate at least one of the disadvantages of the prior art, or to provide a useful alternative.

One embodiment provides a system configured to provide training to a user, the system including:

an input configured to receive performance sensor data from one or more performance sensor units (PSUs), wherein the one or more performance sensor units are configured to receive performance sensor data (PSD) representative of a physical performance of a skill by a human user;

a processing device that is configured to process the PSD, thereby to identify attributes of the PSD, and compare those attributes with predefined baseline performance data, wherein the predefined baseline performance data includes:

data representative of a set of performance events, wherein the set of performance events are defined relative to a performance timeline;

for each performance event, data representative of attributes that are able to be satisfied by PSD; and inter-event relative timing data for one more combinations of the performance events;

a user interface control component that is configured to control the rendering of a graphical user interface, wherein the graphical user interface provides one or more resources that are delivered at a controlled performance rate;

a rate control module, wherein the rate control module is configured to control the controlled performance rate based on comparison of the PSD and the predefined baseline performance data.

One embodiment provides a computer implemented method for adaptive delivery of skills training data, the method including:

receiving performance data derived from one or more performance sensor units;

performing a reconciliation action, wherein:

a given one of the user interface components includes a rendered progression object that progresses at a rate, wherein the rendered progression object progresses along a pathway that includes a plurality of performance event identification objects; and the reconciliation action includes determining whether the performance data is (i) reconciled temporally with the performance event identification object; and/or (ii) reconciled accurately with the performance event identification object;

adjusting the rate such that the rendered progression object is prevented from progressing along the pathway beyond a given one of the performance event identification objects in absence of performance data that is (i) reconciled temporally with the performance event identification object; and/or (ii) reconciled accurately with the performance event identification object.

One embodiment provides a computer implemented method for adaptive delivery of skills training data, the method including:

receiving performance data derived from one or more performance sensor units;

processing performance data derived from one or more performance sensor units; and based on identification of predefined observable data conditions in the performance data, performing a media adjustment action, wherein:

a given one of the user interface components includes a media object that has a playback rate and a viewport definition; and performing the media adjustment action includes making a determination to adjust the playback rate and/or viewport definition.

One embodiment provides a computer implemented method for adaptive delivery of skills training data, the method including:

receiving performance data derived from a set of motion sensor units;

causing a graphical object to be displayed on a display screen, wherein the graphical object includes a representation of phases of physical performance of a motion-based skill, including target locations for one or more MSUs at each phase of the physical performance;

progressing between display of the phases of the physical performance based on analysis of the performance data derived from the set of motion sensor units;

displaying via the graphical object a relationship between an observed position of a given one of the motion sensor units determined based on analysis of the performance data derived from the set of motion sensor units.

One embodiment provides a computer program product for performing a method as described herein.

One embodiment provides a non-transitory carrier medium for carrying computer executable code that, when executed on a processor, causes the processor to perform a method as described herein.

One embodiment provides a system configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which.

DETAILED DESCRIPTION

Figure 1A:
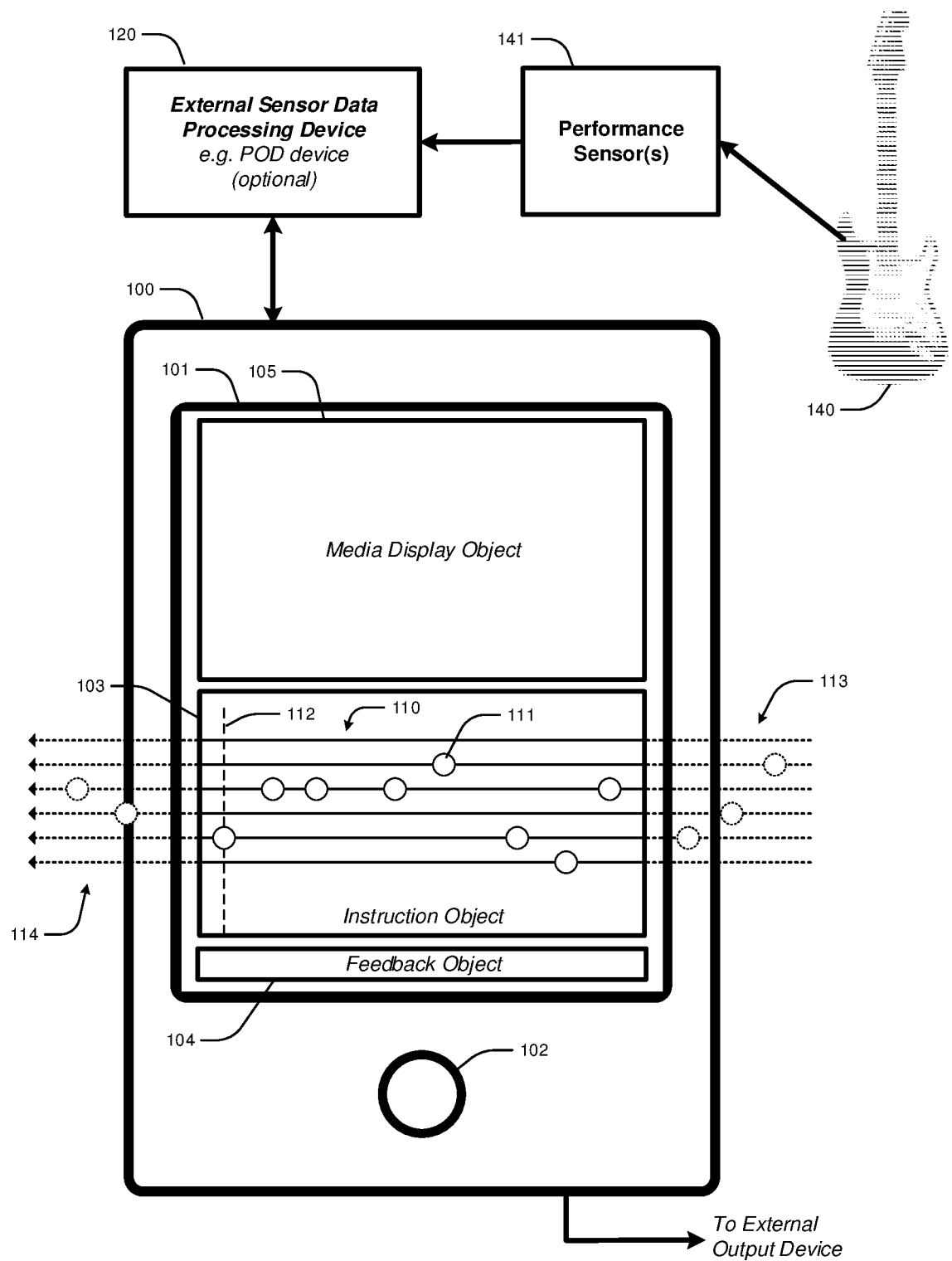
FIG. 1A schematically illustrates a framework for the delivery of interactive skills training content according to one embodiment.

Described herein are to frameworks and methodologies configured to enable real-time adaptive delivery of skills training data based on monitoring of user performance data. Embodiments of the invention have been particularly to enable real-time control over a performance instruction user interface (for example in terms of rate), and/or control over delivery of media data (for example in terms of rate and/or pan/zoom position). While some embodiments will be described herein with particular reference to that application, it will be appreciated that the invention is not limited to such a field of use, and is applicable in broader contexts.

General Overview

Technology and methodologies described herein relate, in general terms, to technical environments wherein various forms of sensors are used to gather data, thereby to enable monitoring and analysis of skills that are physically performed by users. For example, this includes:

(i) Use of wearable motion sensor units to monitor the physical performance of motion-based skills (such as sports). For example, in some embodiments one or more motion sensor units (for example units including components such as accelerometers, gyroscopes, and the like) are physically attached to a human user and/or equipment carried by the human user.

(ii) Use of audio sensors (including sensors that monitor audio via vibrational sensing, digitisation, and other means) to monitor performance of sound-based skills (for example musical and/or linguistic skills). A common example includes a "pickup" deice, which includes a transducer configured to sense mechanical vibrations in strings of a stringed instrument.

(iii) Various other forms of sensors that are configured to enable monitoring of a range of other skill types. This may include software-based sensors that are configured to identify and analysis performance data that is available in a computer system.

Various embodiments described below are directed to addressing technical problems associated with real-time monitoring of performance data, and delivery of feedback to a user in a manner that facilitates training and learning. By way of example, monitoring and processing of sensor data enables the delivery of an automated adaptive coaching curriculum.

Terminology

For the purpose of embodiments described below, the following terms are used:

Performance Sensor Unit (PSU). A performance sensor unit is a hardware device that is configured to generate data in response to monitoring of a physical performance. Examples of sensor units configured to process motion data and audio data are primarily considered herein, although it should be appreciated that those are by no means limiting examples.

Performance Sensor Data (PSD). Data delivered by a PSU is referred to as Performance Sensor Data. This data may comprise full raw data from a PSU, or a subset of that data (for example based on compression, reduced monitoring, sampling rates, and so on).

Audio Sensor Unit (ASU). An audio sensor unit is a category of PSU, being a hardware device that is configured to generate and transmit data in response to monitoring of sound. In some embodiments an ASU is configured to monitor sound and/or vibration effects, and translate those into a digital signal (for example a MIDI signal). One example is an ASU is a pickup device including a transducer configured to capture mechanical vibrations in a stringed instrument and concert those into electrical signals.

Audio Sensor Data (ASD). This is data delivered by one or more ASUs.

Motion Sensor Unit (MSU). A motion sensor unit is a category of PSU, being a hardware device that is configured to generate and transmit data in response to motion. This data is in most cases defined relative to a local frame of reference. A given MSU may include one or more accelerometers; data derived from one or more magnetometers; and data derived from one or more gyroscopes. A preferred embodiment makes use of one or more 3-axis accelerometers, one 3-axis magnetometer, and one 3-axis gyroscope. A motion sensor unit may be "worn" or "wearable", which means that it is configured to be mounted to a human body in a fixed position (for example via a garment).

Motion Sensor Data (MSD). Data delivered by a MSU is referred to as Motion Sensor Data (MSD). This data may comprise full raw data from a MSU, or a subset of that data (for example based on compression, reduced monitoring, sampling rates, and so on).

MSU-enabled garment. A MSU enabled garment is a garment (such as a shirt or pants) that is configured to carry a plurality of MSUs. In some embodiments, the MSUs are mountable in defined mountain zones formed in the garment (preferably in a removable manner, such that individual MSUs are able to be removed and replaced), and coupled to communication lines.

Training Program. The term "training program" is used to describe an interactive process delivered via the execution of software instructions, which provides an end user with instructions of how to perform, and feedback in relation to how to modify, improve, or otherwise adjust their performance. In at least some embodiments described below, the training program is an "adaptive training program", being a training program that executes on the basis of rules/logic that enable the ordering of processes, selection of feedback, and/or other attributes of training to adapt based on analysis of the relevant end user (for example analysis of their performance and/or analysis of personal attributes such as mental and/or physical attributes).

It should be appreciated that whenever the terms PSU and/or PSD are used, those are able to include either or both of MSU/ASU and MSD/ADS respectively. Specific examples are provided further below in both the motion and audio space.

CROSS REFERENCE TO RELATED APPLICATIONS

The present application, incorporates by cross reference the entirety of the following PCT patent applications: PCT/AU2016/000020; PCT/AU2016/000026; PCT/AU2016/050348; and PCT/AU2016/050349. It will be appreciated that those applications provide substantial context relating to technologies that are optionally applied in relation to hardware, software and methodologies in support of technology described herein. For example, embodiments described herein optionally make use of MSU-enabled garments described in those PCT applications.

Whilst those applications are incorporated by cross reference, the disclosure herein should not be necessarily limited in scope by reference to the disclosures of those applications. That is, technology described herein has application beyond what is taught in the cross-referenced PCT applications, for example applications using alternate forms of PSUs, alternate client-side hardware arrangements, alternate networked data management/sharing frameworks, and so on.

Controlling User Interface Delivery Attributes Based on Performance Monitoring

Embodiments described herein include frameworks and methodologies configured to enable real-time adaptive delivery of skills training data based on monitoring of user performance data. For example, these enable real-time control over a performance instruction user interface (for example in terms of rate), and/or control over delivery of media data (for example in terms of rate and/or pan/zoom position).

Some embodiments provide a computer implemented method for adaptive delivery of skills training data. The method includes: (i) receiving performance data derived from one or more performance sensor units; (ii) processing the performance data derived from the one or more performance sensor units; (iii) based on processing the data derived from the one or more performance sensor units, making a determination to vary a delivery attribute of one or more user interface components; and (iv) providing a signal thereby to effect the determined variation in delivery attributes of the one or more user interface components.

In examples described below, particular attention is given to the examples of musical instrument tuition (specifically guitar). In the example of musical instrument tuition, the received performance data includes performance data derived from one or more ASUs configured to monitor user operation of a piece of equipment, such as a musical instrument. For example, in the context of a guitar, the one or more ASUs may include sensors configured to generate digital data in response to audio data generated by the guitar. This may include an audio sensor, which is in some embodiments an audio sensor including a microphone component, and in some embodiments is an audio sensor that is configured to monitor vibrational activity in the guitar's strings. In that regard, the term ASD or "audio sensor" refers to any sensor device that is configured to provide digital information that is represented, directly or indirectly, of audible sounds generated by a performance. The digital information may in some embodiments takes the form of MIDI data.

Although examples are described by particular reference to musical instrument tuition, it should be appreciated that various aspects of technology described in conjunction with those embodiments are able to be applied in other environments which make use of other forms of performance sensor units for alternate forms of skills training. For example, the received performance data in some embodiments includes performance data derived from one or more motion sensor units (such as motion sensor units provided by a motion sensor enabled garment, the processing the performance data derived from the one or more motion sensor units including identifying characteristics of simultaneous motions of individual motion sensors). Examples are provided in relating to gold swing tuition.

In some embodiments, processing performance data (PSD) derived from the one or more PSUs includes processing performance data (MSD) derived from the one or more MSUs. This optionally includes monitoring motion attributes, thereby to determine physical motion attributes of a performance based on motion and/or relative motion of one or more PSUs. As described below, this allows determination of PSU positioning (and/or motion) at defined moments in time, and comparison of that positioning (and/or motion) with predefined target positioning (and/or motion). In some embodiments, technology described in the cross-referenced PCT application is used thereby to provide a deeper understanding into the meaning and relevance of PSD in the context of skills training, for example using symptoms, causes, and observable data conditions (ODCs).

In overview, PSD is utilised as an input to control aspects of a user interface, being a user interface that is configured to provide training data for a skill that is analysed via PSD. That is, observed attributes of a user performance are used to provide real-time control over attributes of a user interface, by way of effecting variation in delivery attributes of the one or more user interface components. The delivery attributes include one or more of the following:

Rate of activity of a progressive user interface component. For example, a given user interface component may be associated with a progression rate, for example: a rate at which a rendered objective moves (or appears to move relative to a further object), a rate at which a rendered object changes in state.

Rate of delivery of an animation or media file. For example, the playback rate for a video or audio file is dynamically varied.

A view-port for a media object. For example, this may include the application of a digital pan and/or zoom operation thereby to show a reduced selection of frame area during rendering of a video file.

A viewing angle for a media object. This may include in-file angle adjustment (where a given media object, or media object collection) is able to support such adjustments), and in other cases includes switching to a further media file having a common synchronised timeline captured from a different viewing angle. One example includes utilisation of media collected from multiple angles, which is processed thereby to enable smooth viewpoint adjustment between angles, either through a single still frame or across multiple frames. For example, bullet time technology or the like may be used.

Other delivery attributes may also be used.

Specific implementation examples include:

Provision of an "adaptive-tempo" mode. This is relevant in the context of training programs where a skill is performed and/or instructed at a rate, which is typically defined by reference to pre-assessment of user ability level. As context, conventionally in the context of a musical training program, a tempo is selected based on pre-assessment of a user's ability level, and a user provided instructions to play a musical track at that tempo. For example, a novice user might have tempo set at 25% of normal, and the tempo is increased towards 100% as the user's abilities progress. Adaptive tempo mode, on the other hand, dynamically varies the progress rate (and hence the tempo) in response to the rate at which the user actually plays the musical track based on continuous monitoring of the user' performance.

Provision of a progressive training structure, based around: (i) an adaptive-tempo mode in which a user controls rate of progression of a user interface component, and analytical focus is placed on accuracy of individual performance elements; (ii) and adaptive rate mode, wherein the user again controls rate of progression of the user interface component, and analytical focus is placed on accuracy of individual performance elements and inter-element tempo (accuracy of timing); and (iii) a fixed-tempo mode wherein a rate of performance is predefined.

Efficient utilisation of media content. This is relevant in the context of training programs that display media content to assist in training, for example video data. Based on analysis of PSD, the display of media content is varied, for example in terms of pan/zoom position and/or rate. This allows a significantly richer us:er experience to be delivered via a single or limited collection of media files, avoiding a need to collect and/or maintain an extensive collection of media files.

These examples and others are discussed in more detail further below.

Adaptive Tempo Mode

Figure 4:
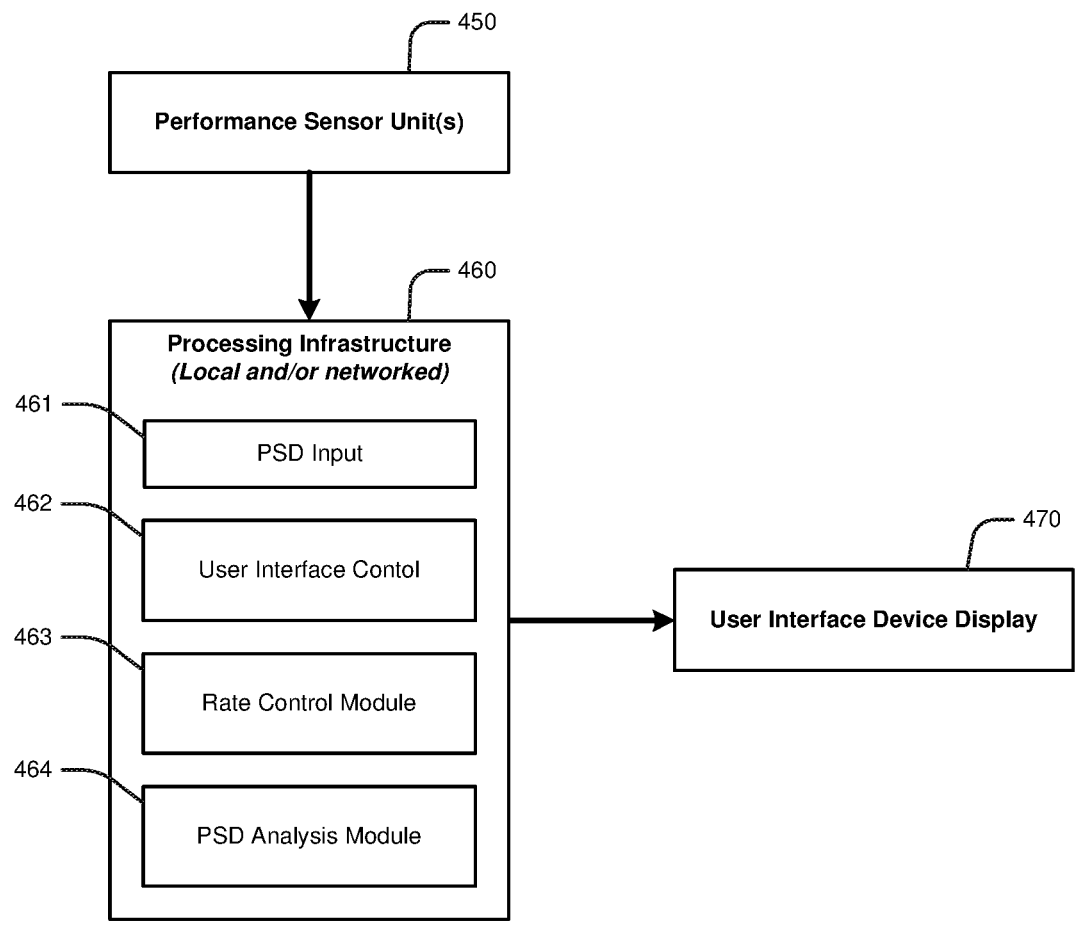
FIG. 4 functionally depicts a platform according to one embodiment.

FIG. 4 illustrates a system configured to provide training to a user. The system includes an input 461 configured to receive performance sensor data from one or more performance sensor units 450. (PSUs), wherein the one or more performance sensor units are configured to receive performance sensor data (PSD) representative of a physical performance of a skill by a human user. For example, in some embodiments the received PSD includes performance data derived from one or more sensors configured to monitor user operation of a piece of musical instrument. In other embodiments the received PSD includes performance data derived from one or more motion sensor units (for example the one or more motion sensor units are provided by a motion sensor enabled garment).

A processing device 460 includes a PSD analysis module 464 that is configured to process the PSD, thereby to identify attributes of the PSD, and compare those attributes with predefined baseline performance data. The baseline performance data includes data representative of a set of performance events, defined relative to a performance timeline (for example as a skill performance stream). For each performance event, there is defined data representative of attributes that are able to be satisfied by PSD. For example, in the case of ASD, this may include any one or more of pitch, playing style, duration, and so on. For MSD, this may include any one or more of relative position, velocity, acceleration, and the like. The baseline performance data also includes inter-event relative timing data for one or more combinations of the performance events. This provides a rate-independent tempo (for example the baseline temporal spacing between a first and second performance event is defined to be twice the temporal baseline spacing between the second and a third performance event). The baseline data may also include a target performance rate.

Device 460 includes a user interface control component that is configured to control the rendering of a graphical user interface (in this example rendered on a display 470). The graphical user interface provides one or more resources that are delivered at a controlled performance rate. For example, these resources include a progression object (described in detail below) which progresses at the performance rate, and optionally media (such as video and audio) which is also rendered at the controlled performance rate. A rate control module 465 is configured to control the controlled performance rate based on comparison of the PSD and the predefined baseline performance data.

As noted, in some embodiments the one or more resources that are delivered at the controlled rate include a rendered progression object that progresses at the controlled performance rate. The rendered progression object is controlled to progress along a pathway that includes a plurality of performance event identification objects, wherein the performance event identification objects correspond to the performance events.

Figure 5A:
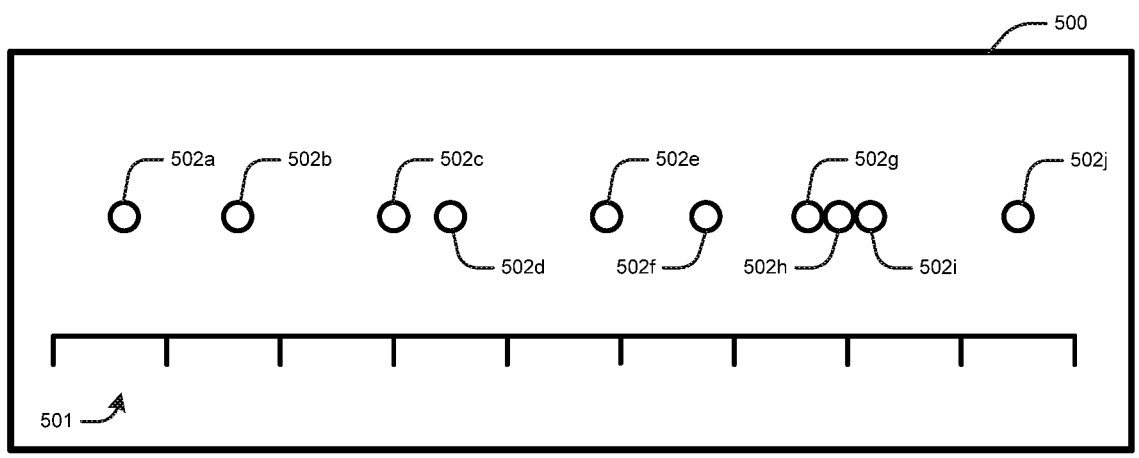
FIG. 5A illustrates a timeline of skill performance event identification objects.
Figure 5B:
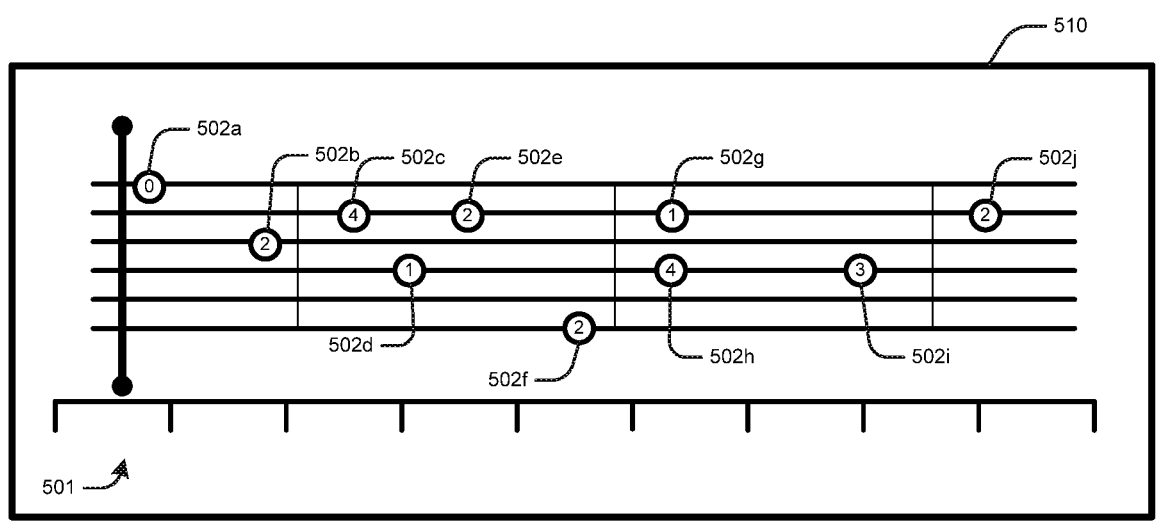
FIG. 5B illustrates a timeline of skill performance event identification objects for a guitar training program.

A first example is illustrated in a graphical manner in FIG. 5A, a progression object 500 includes a timeline 510 and a plurality of performance event identification objects 502a to 502j. Preferably, an identifier object indicates a current position of progression along the timeline (this may move relative to a stationary timeline and objects, or the timeline and objects may mode relative to the identifier object. A second example object 510 is illustrated in a graphical manner in FIG. 5B, this showing objects 502a to 502j in a manner that indicates musical notes playable by an instrument, with inter-object spacing along timeline 501 being representative of tempo. A third example object 520 is illustrated in a graphical manner in FIG. 5C, this showing objects 502a t0 502j as body positions through which a user progresses whilst performing a motion-based skill.

Figure 5C:
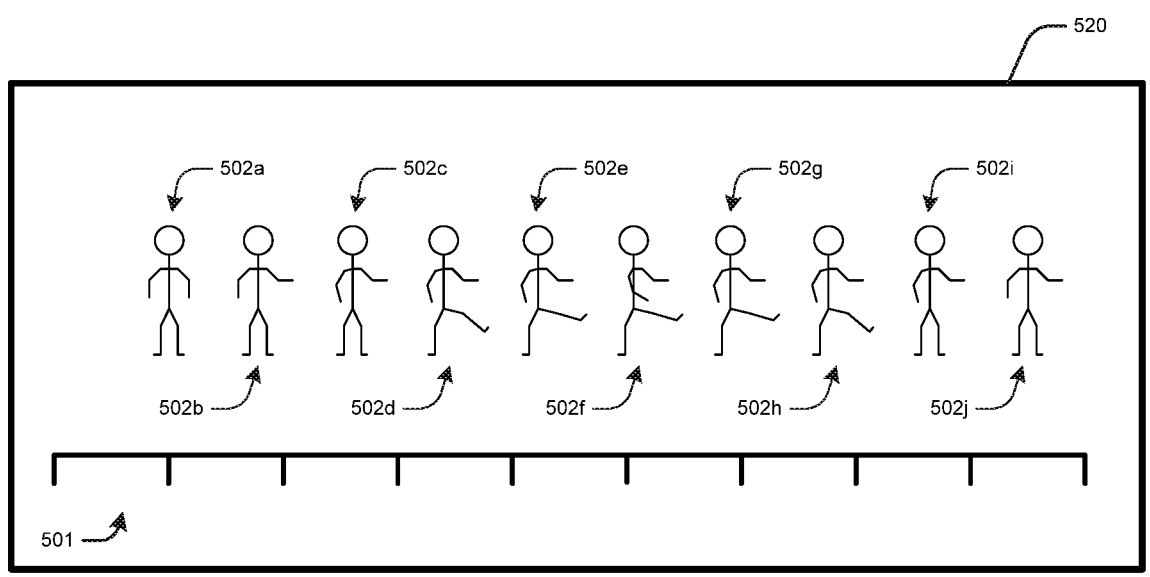
FIG. 5C illustrates a timeline of skill performance event identification objects for a motion-based skill training program.

In one mode of operation, the rate control module is operated such that the rendered progression object is prevented from progressing along the pathway beyond a given one of the performance event identification objects in absence of performance data that is: (i) reconciled temporally with the performance event identification object; and/or (ii) reconciled accurately with the performance event identification object. For example, in the context of FIG. 5B, this includes hitting the correct musical note. In the context of FIG. 5C, this includes hitting each of the relevant body positions (optionally defined by motion attributes other than position alone, for example by reference to acceleration attributes). This provides an adaptive tempo mode whereby the rate of the rendered progression object is controlled based on the rate at which the received PSD demonstrates performance events having attributes satisfied by the received PSD. In other words, the rate dynamically adjusts in real time based upon a user's success in performing the performance events. Preferably the controlled performance rate is adjusted for a rate of progression between successive performance event identification objects based upon a prediction of an anticipated time for receipt of performance data reconcilable with an upcoming performance event identification object.

The system preferably includes a feedback control module, wherein the feedback control module is configured to perform a defined feedback action in response to predefined conditions, the predefined conditions including identification of performance data that is: (i) reconciled temporally with the performance event corresponding to the performance event identification object; and (ii) not reconciled accurately with the performance event corresponding to the performance event identification object. Examples are provided further below.

Preferably, the system also includes a rating module, wherein the rating module is configured to score characteristics of a performance based on comparison of the received PSD with the predefined baseline performance data. As discussed in more detail further below, rating module is configured to operate in multiple modes, including:

a first mode wherein the controlled performance rate is controlled based on analysis of the PSD, and wherein the rating is based on accuracy with which the PSD satisfies data representative of attributes for each successive performance event;

a second mode wherein the controlled performance rate is controlled based on analysis of the PSD, and wherein the rating is based on accuracy with which the PSD satisfies data representative of attributes for each successive performance event and comparison of observed inter-event relative timing data for one more combinations of the performance events with the inter-event relative timing data for one more combinations of the performance events of the baseline performance data; and a third mode wherein the controlled performance rate is set to a constant value independent of real time monitoring of the PSD, and wherein the rating is based on accuracy with which the PSD satisfies data representative of attributes for each successive performance event.

Various examples are discussed in more detail further below.

Example: Adaptive Tempo Mode (Audio Performance Embodiment)

As noted, some examples provide an "adaptive tempo" mode for a skills training user interface. Examples are described initially by reference to FIG. 1A.

FIG. 1A illustrates an exemplary framework for delivery of an adaptive skills training program. A user interface device 100 (illustrated in a manner representative of a touch screen mobile device, such as a smartphone or tablet for the sake of example only, and a wide range of other devices may alternately be used, including devices that provide a display via a headset and/or retinal display/projection) provides a rendering of a user interface via a display screen 101. The rendering of the user interface is controlled by the execution of software instructions via a microprocessor of device 100, which may include software instructions executing at device 100 and/or at one or more devices in communication with device 100 (for example a networked device that communicates with device 100 via the Internet, and/or another local device configured to perform processing functions. In this example, the user interface device 100 is configured to provide an adaptive skills training program for musical tuition, specifically guitar tuition. A guitar 140 is operated by a user, with one or more PSUs 141 being configured to monitor the performance. For instance, a PSEs 140 may include a PSU that is configured to monitor vibrational energy in the strings of guitar 140, and provide PSD for analysis. The PSD preferably is in MIDI format, but other data formats may also be used.

In the illustrated embodiment, PSUs 141 transmit the PSD to an external sensor data processing device 120, referred to as a POD device. Device 120 is configured to execute computer executable code representative of state engine data, being data that configures device 120 to process the PSD thereby to identify ODCs that are specific to the form of guitar tuition being delivered. Alternate state engine data may also be executed by device 120 where alternate PSD and ODCs are relevant (for example where the POD device is used to process PSD relating to alternate forms of musical instruments, PSD derived from MSUs in the context of a motion-based activity, and so on). As noted in FIG. 1A, an external device 120 is optional, and in some embodiments the functionality of device 120 is provided by way of software executing on the hardware provided by device 100 (and/or at a remote networked device).

Communications between sensors 141, device 120 (where used) and device 100 may be wired and/or wireless, depending on a particular implementation environment (and availability of adequately reliable wireless communications protocols).

As context, the underlying technical methodology includes analysing PSD, thereby to determine a performance rate. This is a performance rate inherently defined by a user, based on the rate at which they are actually performing (as opposed to a performance rate that is predefined based on analysis of user attributes, such as an ability level, and forced upon a user). In that regard, a performance includes a plurality of "performance events", being events defined along a performance timeline. Based on analysis of PSD, the performance rate is set such that a user interface that displays data representative of the performance events reaches the performance events at the same time as the user performance. For example, a user interface in some embodiments includes a performance timeline object that graphically progresses along a performance timeline that includes performance event identification objects. The rate at which the performance timeline object progresses is responsive to the rate at which the user's actual performance occurs in real time, such that the physical performance and performance timeline are time synchronised across performance events.

In the example of FIG. 1A, the user interface provides a rendered object that progresses at a rate, in the form of an instruction object 103. Instruction object 103 is configured to progress along a pathway that includes a plurality of performance event identification objects 111. In this example, the performance event identification objects are icons displayed on a musical tuition ribbon 110, this ribbon moving from right to left. FIG. 1A additionally illustrates, in dashed lines, a previously displayed portion 114 of ribbon 110, and an upcoming portion 113 of ribbon 114. A current position is visually represented by a display a progression object 112. That is, display progression object 112 overlaps a given one of performance event identification objects 111 at a point in time when that event occurs in the user's real world performance.

It is particularly relevant that display progression object 112 overlaps a given one of performance event identification objects 111 at a point in time when that event occurs in the user's real world performance. In various prior art arrangements, a user interface of similar external appearance is provided, but is configured such that the display progression object overlaps a given one of performance event identification objects at a point in time when a user is instructed to perform that event occurs in the real world performance. Whether or not the user actually performs an event (e.g. in this context plucking a guitar string) is irrelevant in the prior art scenario; the ribbon continues to progress at a defined rate (although the rate may increase or decrease based on user accuracy). However, in the example of FIG. 1A, PSD is processed in real time to perform dynamic progression rate adjustment such that display progression object 112 overlaps a given one of performance event identification objects 111 at a point in time when a corresponding event actually occurs in the user's real world performance.

In a preferred embodiment, the performance rate is adjusted such that the rendered object is prevented from progressing along the pathway beyond a given one of the performance event identification objects in absence of performance data that is reconciled with the performance event identification object. That is, in the context of FIG. 1A, ribbon 110 is prevented from progressing a given one of event objects 111 beyond progression object 112 unless analysis of PSD identifies a real world event that is able to be reconciled with that progression object. The reconciliation may include either or both of: (i) temporal reconciliation with the performance event identification object (e.g. a note is played at the relevant point in time); and (ii) accuracy-based reconciliation with the performance event identification object (e.g. the correct note is played). It should be appreciated that whether one or both of these is used provides a substantively different tuition experience. Where both are used, the user is in effect provided an extended opportunity to hit the correct note, before moving on. For example, upon a given event object 111 reaching progression object 112, the user may play the wrong note, in which case the ribbon remains in place until the correct note is played (or, in some cases, until another rules-based event is triggered).

The preceding disclosure pertains to rate control in the context of limiting progression beyond performance event identification objects in response to analysis of PSD. In some embodiments, rate control is also applied in relation to progression rates between performance event objects. For example, an algorithm is configured to control the progression rate between a performance event identification object $EO_n$ (corresponding to a performance event $PE_A$), and a subsequent performance event identification object $EO_{n+1}$ (corresponding to a performance event $PE_{n+1}$). Preferably, the performance rate is adjusted based upon a prediction of an anticipated time for receipt of performance data reconcilable with an upcoming performance event identification object. A range of inputs are used in various embodiments to support such a prediction, and examples include:

- An average observed performance rate for intervals between $PE_{n-i}$, $PE_n$. For example, in some embodiments the average is calculated based on the rate at which the preceding i notes were played. The averaging may be a weighted average, for example weighted in favour of more recent inter-event intervals.
- Data representative of the particular user's ability to progress from $PE_n$ to $PE_{n+1}$ (for example derived from observation of historical PSD). For example, this may be based upon an average observed time it has previously taken for a user to move from a performance event $PE_n$ to $PE_{n+1}$, or move between similar performance events.
- Data representative of the particular user's competency in a skill required to progress from $PE_n$ to $PE_{n+1}$ (for example derived from observation of historical PSD).
- Data representative of the particular user's current mental and/or physical condition. For example, this is in some embodiments derived from a user interface component that is configured to gain user input in response to predefined stimuli (such as an interface that asked a question prior to a tutorial such as "how are you feeling today"). In further embodiments, this alternatively or additionally includes prediction based upon analysis of historical PSD (for example whether the user is making more mistakes over time, and hence likely becoming tired and/or frustrated).

By way of rate modification and prediction, an "adaptive tempo" mode is able to be delivered via object 103, with the rate of movement of ribbon 110 being dynamically controlled in real time based on observation of the user's real-world performance. By way of the approaches described above, a user is free to play a tune represented on ribbon 110 at whatever variable tempo the user desires, with the graphical user interface adapting reactively to accommodate the user's tempo.

In some embodiments one or more further user interface objects (i.e. other than instruction object 103) are effected by the determination of a progression rate. For example, as shown in the example of FIG. 1A, these may include a media display object, which is configured to display rendered media such as video (including in some embodiments video with overlays), audio and/or an animation. Preferably, the media is played at the determined dynamically varying progression rate. In the embodiment of FIG. 1A, media display object is configured to display a rendering of a video file, and the video file is time-synchronised with instruction object 103. That is, for example, each performance event identification object 111 corresponds to a particular frame of video, such that the particular frame is displayed when progression object 112 overlaps with the relevant object 111. For example, in one embodiment the video shows a person playing guitar, and notes are struck in synchronicity with the progression of ribbon 110.

Preferably, the video has associated audio, for example accompanying music coinciding with the time being played by the user. It will be appreciated that predictive rate adjustment assists in enabling a user to play along with the accompanying music in the adaptive tempo mode. In some embodiments this is further facilitated by rate adjustment that causes progressive rate slowing (or perpetuation of a sound associated with a particular frame) to account for situations where a performance event is delayed beyond what was predicted.

The video may include an overlay representative of predicted user finger positions (derived from processing of PSD), thereby to show a comparison between user finger positioning and correct finger positioning.

In some embodiments, the user interface is configured to perform predefined actions in response to monitoring and processing of failed reconciliation events in respect of processing of PSD to identify performance events corresponding to performance event identification objects. For example, in the case that performance data that is not (i) reconciled temporally with the performance event identification object; and (ii) not reconciled accurately with the performance event identification object, a defined action may be triggered. The defined action may include any one or more of the following:

Variation in delivery attributes of a further user interface component. For instance, this may include an operation applied to media display object 105 (discussed further below), such as a view-port variation and/or the application of an overlay.

Providing feedback, for example via a feedback object 104 and/or via an audio output device.

Adjusting the position of progression object 112. This may include regressing the progression object to a defined point (i.e. effectively rewinding ribbon 111 to a defined point), for example to provide the user with an opportunity to re-attempt a given portion of the performance. In some cases this includes causing the progression object to enter a predefined loop, thereby to enable repeated practice of a particular movement between a set of successive performance events.

Initiating a defined sub-tutorial. For example, this may include a sub-tutorial delivered via object 103 designed to assist a user in developing particular skills that are required to overcome identified difficulties (or lack of competencies) observed via analysis of PSD.

It should be appreciated that specific rules that govern the selection of predefined actions in response to analysis of PSD is a matter of individual curriculum design, and falls beyond the scope of the present disclosure.

Although the above example focuses on the use of a ribbon 110 for the purpose of musical tuition, it will be appreciated that the technology is readily applicable to a range of other skills training situations where a skill is able to be broken down by reference to a stream of performance events. In music, that is achieved by reference to a stream of notes. Similar principles are applicable to a wide range of audio-based skills. In motion-based skills, a complex movement may be broken down by reference to aspects of the movement (which can be particularly helpful in training relative timings of those aspects).

Example: Adaptive Tempo Mode (Audio Performance Embodiment)

Figure 1B:
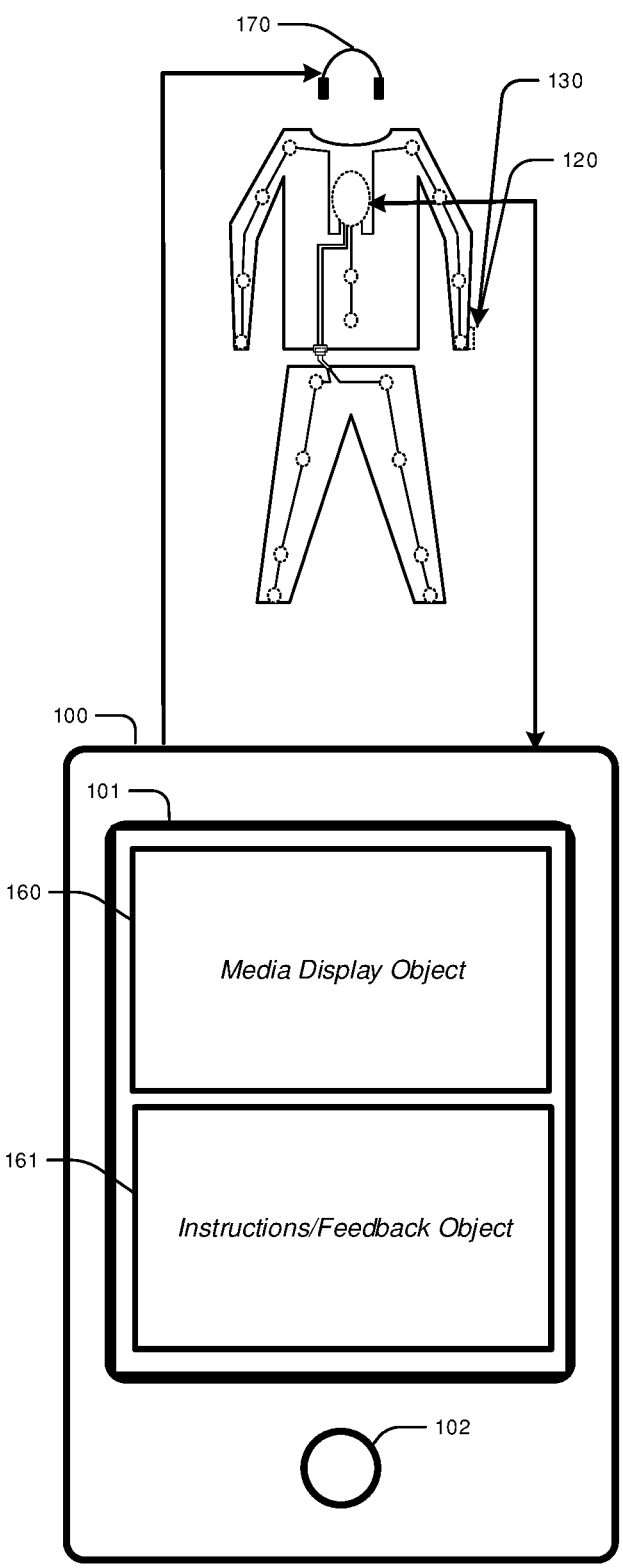
FIG. 1B schematically illustrates a framework for the delivery of interactive skills training content according to one embodiment.

FIG. 1B illustrates an alternate framework which is in some embodiments used to enable delivery of an "adaptive tempo" mode in respect of a motion-based skill. Again, a user interface device 100 (illustrated in a manner representative of a touch screen mobile device, such as a smartphone or tablet for the sake of example only, and a wide range of other devices may alternately be used, including devices that provide a display via a headset and/or retinal display/projection) provides a rendering of a user interface via a display screen 101. In this example, the user interface device 100 is configured to provide an adaptive skills training program for training of a motion-based skill, for example a sports skill (such as juggling, kicking a soccer ball, rowing, and so on). A user wears a MSU enable garment 130, which includes a plurality of MSUs configured to deliver MSD to a POD device 120. POD device 120 is configured to identify ODCs in the MSD, thereby to provide inputs that affect delivery of the training program delivered via device 100. As illustrated, the user also wears a headset 170, which enables delivery of audible feedback. This audible feedback is illustrated as emanating from device 100, although in some embodiments it is provided directly by POD device 120. It will be appreciated that a headset is useful as it is often inconvenient to use a mobile device when practicing motion-based skills. For similar reasons, in some embodiments device 100 takes the form of a wearable unit, for example an augmented realty headset, glasses/goggles with a screen display, a retinal display/projector, and so on.

The user interface displayed on screen 101 in FIG. 1B includes a media display object 160 and an instructions/feedback object 161. For example, in one embodiment object 161 provides a progressive timeline representative of motion aspect events that make up the skill, and object 160 provides an animation or video showing correct form (optionally with an overlay representative of actual user motion as derived from MSD). Objects 160 and 161 are controlled in rate in a similar manner to objects 103 and 105 described above, based on analysis of MSD derived from MSUs provided on MSU enabled garment 130.

Example User Interface Displays

Figure 6A:
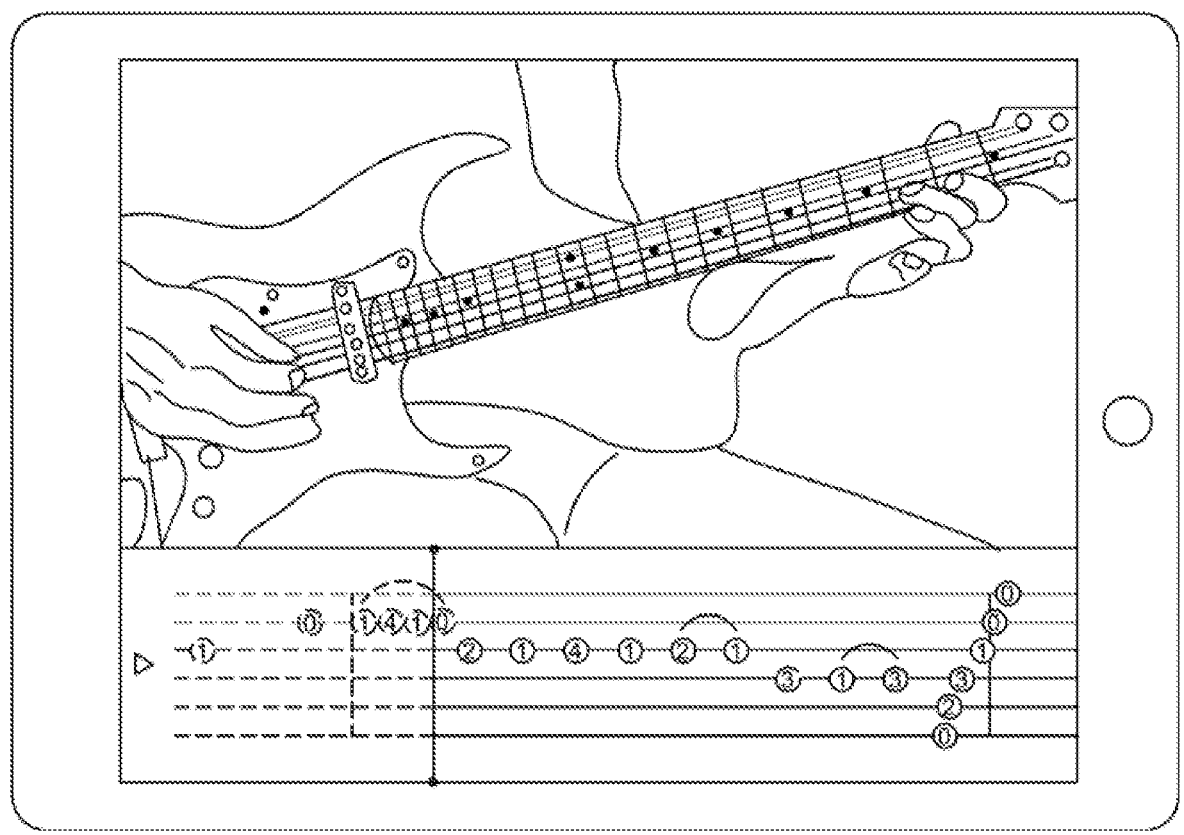
FIGS. 6A, 6B, 6C, 6D, 6E, and 6F illustrate example user interface displays according to embodiments.
Figure 6B:
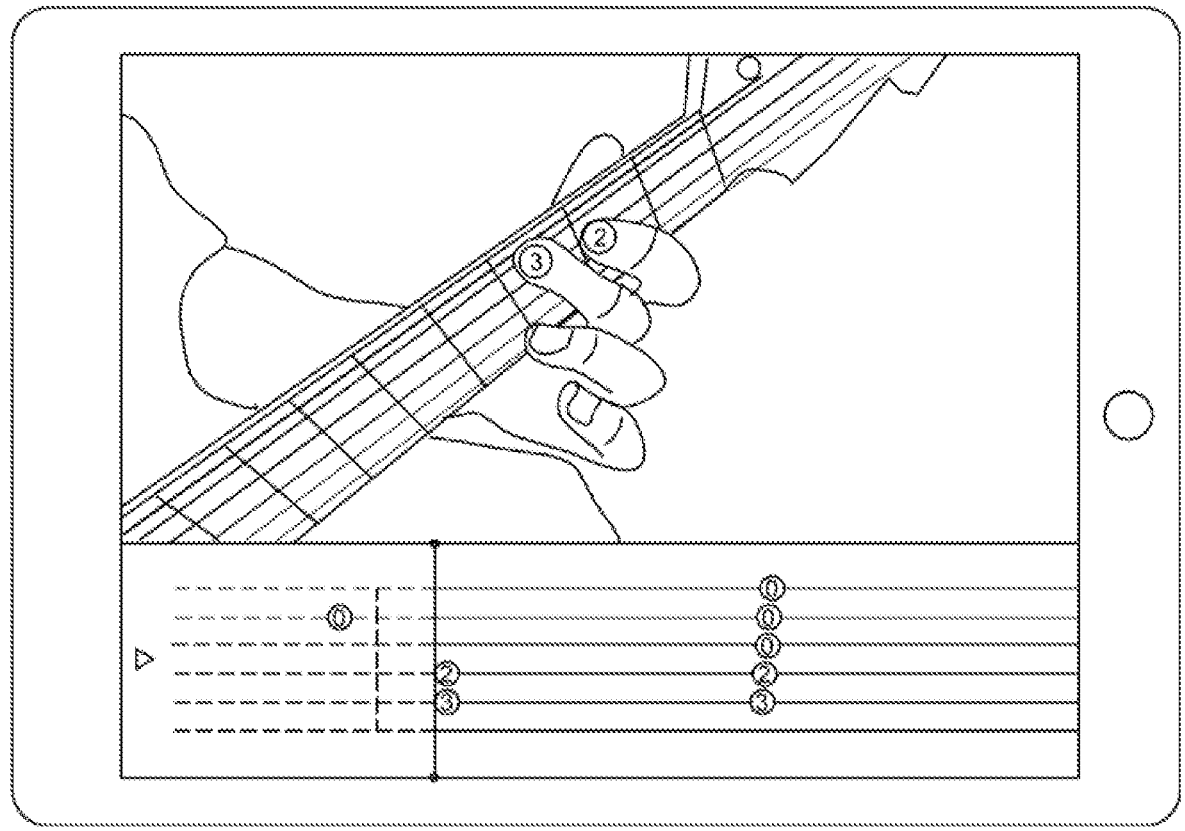

FIG. 6A and FIG. 6B illustrate example user interface displays for a guitar training program using technology described herein.

FIG. 6A shows a progression object configured to provide instructions with respect to playing of notes on a guitar via a scrolling ribbon object, similar to that shown in FIG. 5A. The scrolling occurs at a controlled rate, for example based on processing of ASD received from an ASU coupled to the user's guitar. A progress bar shows a user's current position with respect to performance event identification objects. A media object is also provided, this providing rendering of a video that depicts striking of the notes corresponding to the performance event identification objects. The video is payed at a rate bound to the progression object, thereby to assist a user in visualising how to strike the instructed notes. In FIG. 6B, the video is shown cropped more rightly about the videoed plyer's fingers, with instructional icons superimposed for additional guidance. For example, the display of FIG. 6B may be provided as part of an error identification and training sub process.

Figure 6C:
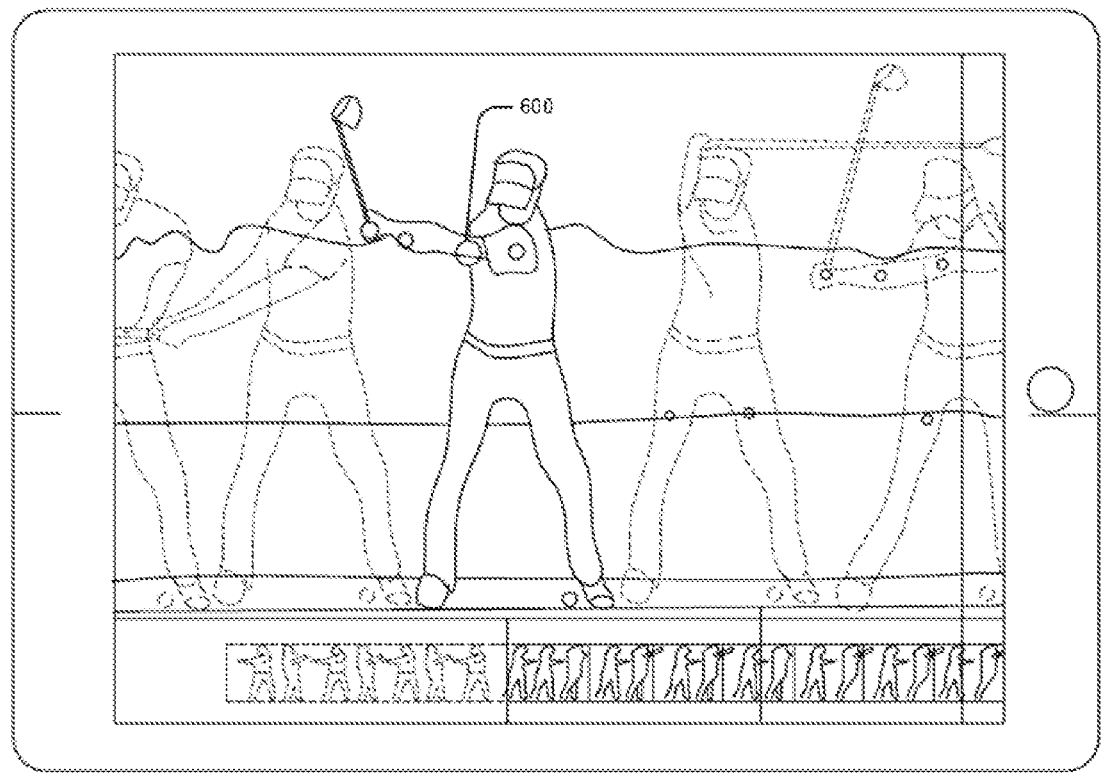

FIG. 6C shows a progression object configured to provide instructions with respect to swinging a golf club. In this case, a plurality of MSU location zones (such as zone 600) are shown thereby to instruct a player as to the correct position of MSUs carried by a MSU-enabled garment during a gold swing motion. In some embodiments a real-time display of actual MSU locations is also provided, thereby to assist the user in visualising and effecting motion/position corrections. In this manner, progressing through a physical activity (such as golf swing) is presented via a progression object in a manner similar to striking notes in a musical piece; the notes are replaced by body part positions, and a user progresses between those to perform the physical activity.

Transition between the positions shown in FIG. 6C may be stepwise or incrementally animated for a smooth transition. FIG. 6C also shows a video animation ribbon at a lower portion of the screen.

Figure 6D:
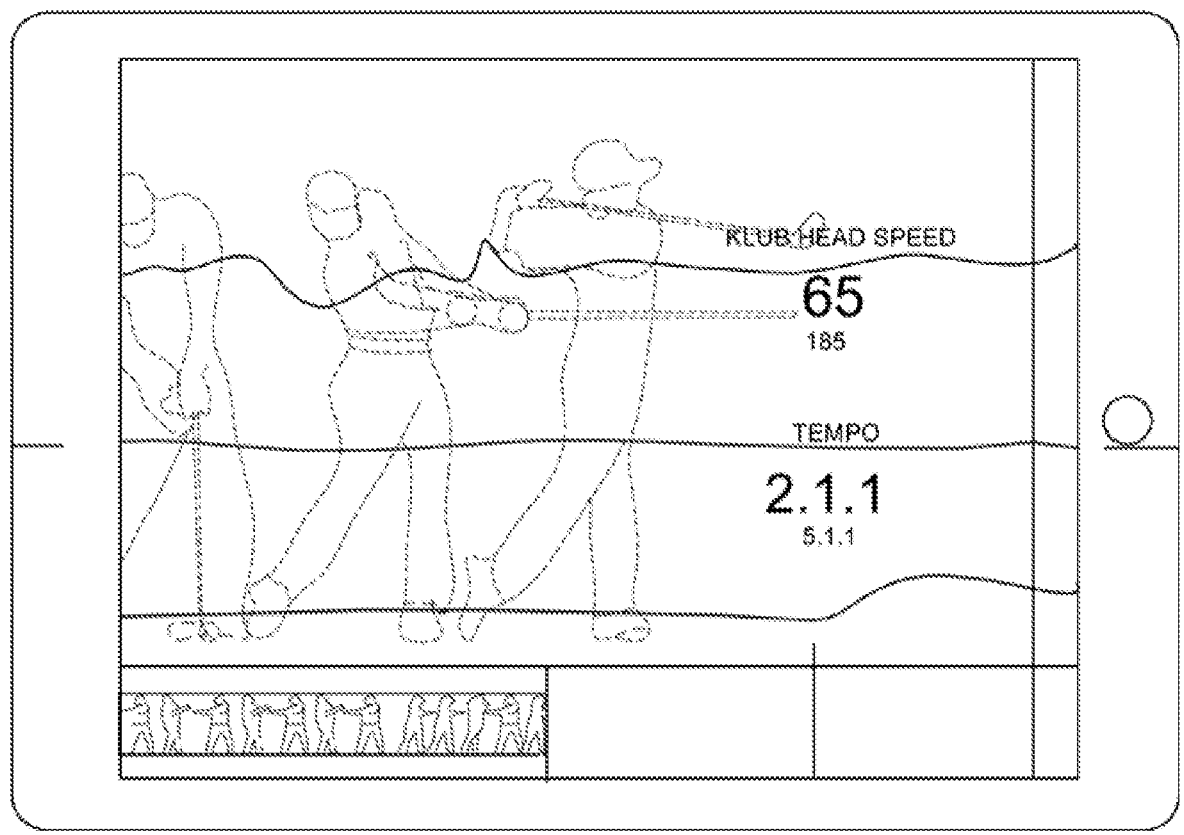

In the example of FIG. 6D, observed attributes of an attempt are displayed, including a comparison between observed and target tempo (in this example "2.1.1" vs "5.1.1") and a calculated club head speed based on the observed attempt (compared with a target). This allows a user to practice the motion by: firstly moving slowly from position to position to achieve accurate positioning and position transitions; secondly practicing tempo of transitions between positions, and then practicing rate (whilst maintaining accuracy of position and tempo).

Figure 6E:
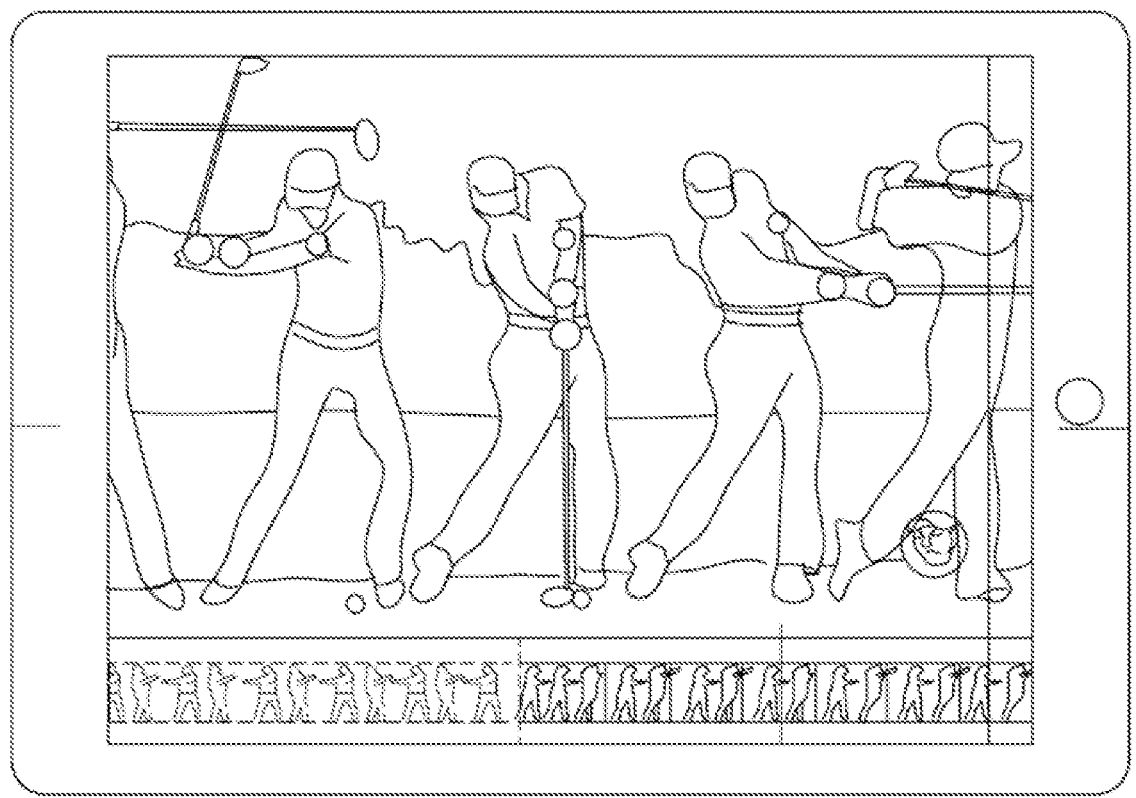
Figure 6F:
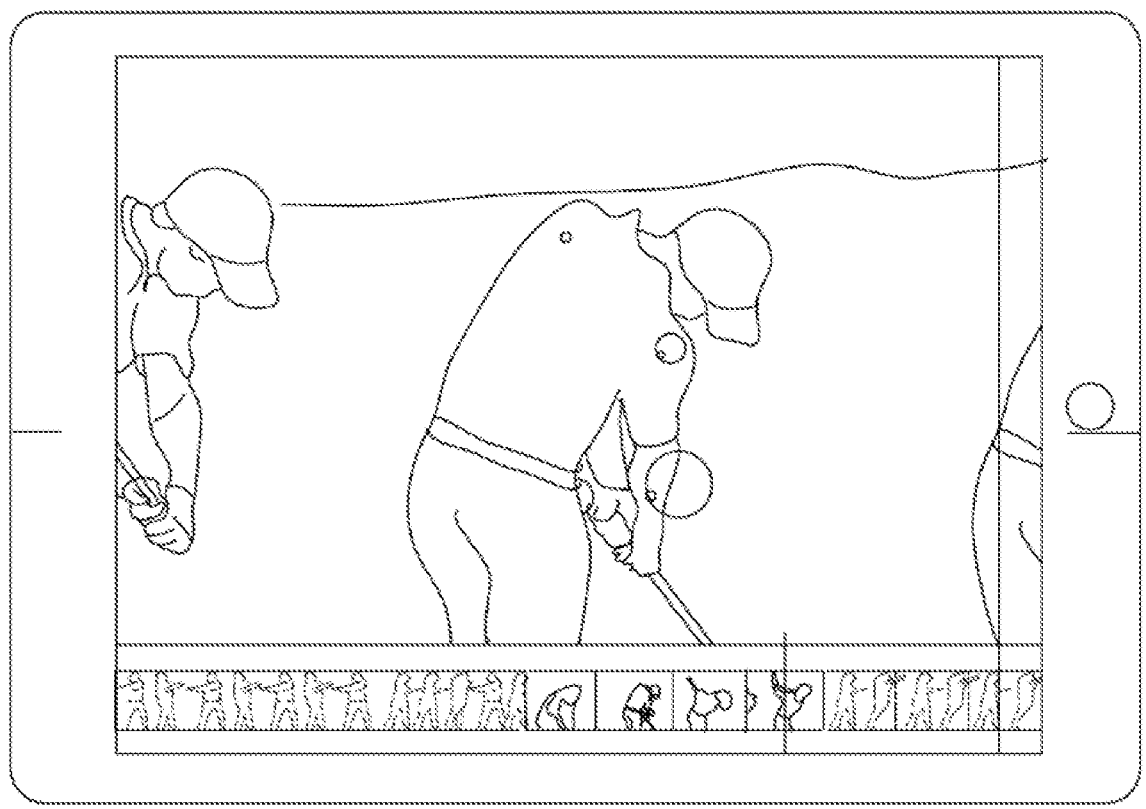

The view of FIG. 6E shows a post-facto analysis display, which assists in identifying errors in motion at particular portions of the motion (for example using cause/symptom/ODC based analysis as disclosed in the cross-referenced PCT applications). This shows actual observed MSU locations relative to instructed MSU locations, and provides feedback thereby to assist in improving performance. The view of FIG. 6F shows the motion graphic from an alternate angle, thereby to assist in visualisation of further MSU locations.

In this manner, as shown in FIG. 6C to 6E, some embodiments provide computer implemented methods for adaptive delivery of skills training data, including: receiving performance data derived from a set of motion sensor units (MSUs); causing a graphical object to be displayed on a display screen, wherein the graphical object includes a representation of phases of physical performance of a motion-based skill, including target locations for one or more MSUs at each phase of the physical performance; progressing between display of the phases of the physical performance based on analysis of the performance data derived from the set of motion sensor units; and displaying via the graphical object a relationship between an observed position of a given one of the motion sensor units determined based on analysis of the performance data derived from the set of motion sensor units.

Example: Efficient Utilisation of Media Content

As noted, some examples provide for efficient utilisation of media content in an adaptive skills training program. This is relevant in the context of training programs that display media content to assist in training, for example video data. Based on analysis of PSD, the display of media content is varied, for example in terms of pan/zoom position and/or rate. This allows a significantly richer user experience to be delivered via a single or limited collection of media files, avoiding a need to collect and/or maintain an extensive collection of media files.

One embodiment provides a computer implemented method including receiving performance data derived from one or more performance sensor units; processing performance data derived from one or more performance sensor units; and based on identification of predefined observable data conditions in the performance data, performing a media adjustment action. In preferred embodiments, a given one of the user interface components includes a media object that has a playback rate and a viewport definition, and performing the media adjustment action includes making a determination to adjust the playback rate and/or viewport definition.

The manner by which playback rate is able to be adjusted is dealt with in detail further above. In overview, processing of PSD enables determination of a rate associated with a user's physical performance, and that rate is applied to media playback. In some embodiments this includes providing an overlay on video data, thereby to show a relationship between a user's actual performance (for example by way of a virtual body model constructed from MSD) and a benchmark performance (for example a benchmark performance captured in the video data).

Figure 2:
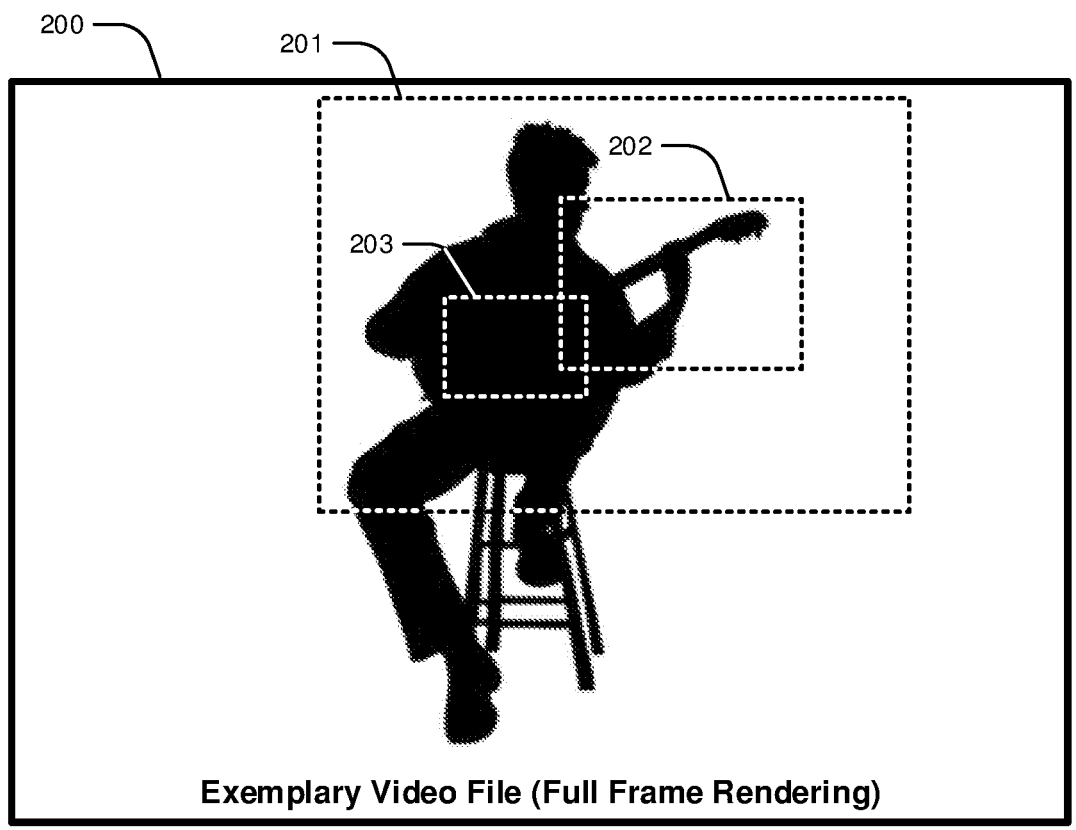
FIG. 2 illustrates an example of viewport definitions according to one embodiment.

Adjustments to viewport definitions are achieved by applying digital pan/zoom transformations to video data, thereby to display a selection of pixels (a viewport) that is less than the full frame rendering of video data. By way of example, FIG. 2 illustrates an exemplary full frame video rendering 200, and a set of viewport definitions. These are illustrated by reference to a video of an expert playing guitar in a video file use for a guitar training program. High definition (for example 4K) high-framerate video is initially captured, this containing at least a maximum field of view that is desired for the training program. Then, when authoring the training program, rules are defined which cause adjustments to viewport definitions in response to defined conditions being met. These defined conditions may include conditions that are satisfied in PSD, or by reference to PSD.

In the example of FIG. 2, the viewport definitions include: (i) a viewport definition 201 which provides a partial zoom showing the player's body; (ii) a viewport definition 202 zoomed to show the player's right hand on the guitar; and (iii) a viewport definition 203 zoomed to show the player's left hand on the guitar. These are used, for example, to provide a user (i.e. a student) a detailed view of how a particular segment of music is played by the videoed expert.

In some embodiments, the guitar is tracked in video data thereby to enable application of overlays to the video data at appropriate positions on the guitar (e.g. relative to the strings), which are used for instance to identify correct finger positions and/or user finger positions (as predicted based on analysis of PSD, such as predictions derived from determination of last finger position from sound/vibration generated).

Association of viewport definitions with PSD-related observations enables dynamic modification of displayed video data thereby to assist in providing a visual aid for skills training that is appropriate for a given point in time for an adaptive training process, without requiring a library of separate video files for a given skill (for example a skill in the context of playing a particular piece of music, or a skill in the form of a particular motion-based skill). A single video file is able to provide multiple forms of visual aid content by adjusting viewport definitions to focus on particular important areas. For example, based on processing of ODCs, a particular body part (or the like) is identified in respect of which feedback and/or tuition is to be provided, and the viewport definition adjusted to focus on that particular body art (or the like).

In some embodiments video capture technology enabling angle alteration is used. This enhances the above embodiments by enabling not only viewport adjustments, but also view angle adjustments. For example, "bullet time" technology enables angle adjustment in video data by capturing a given scene from multiple angles.

Exemplary User Interface Control Platform

Figure 3:
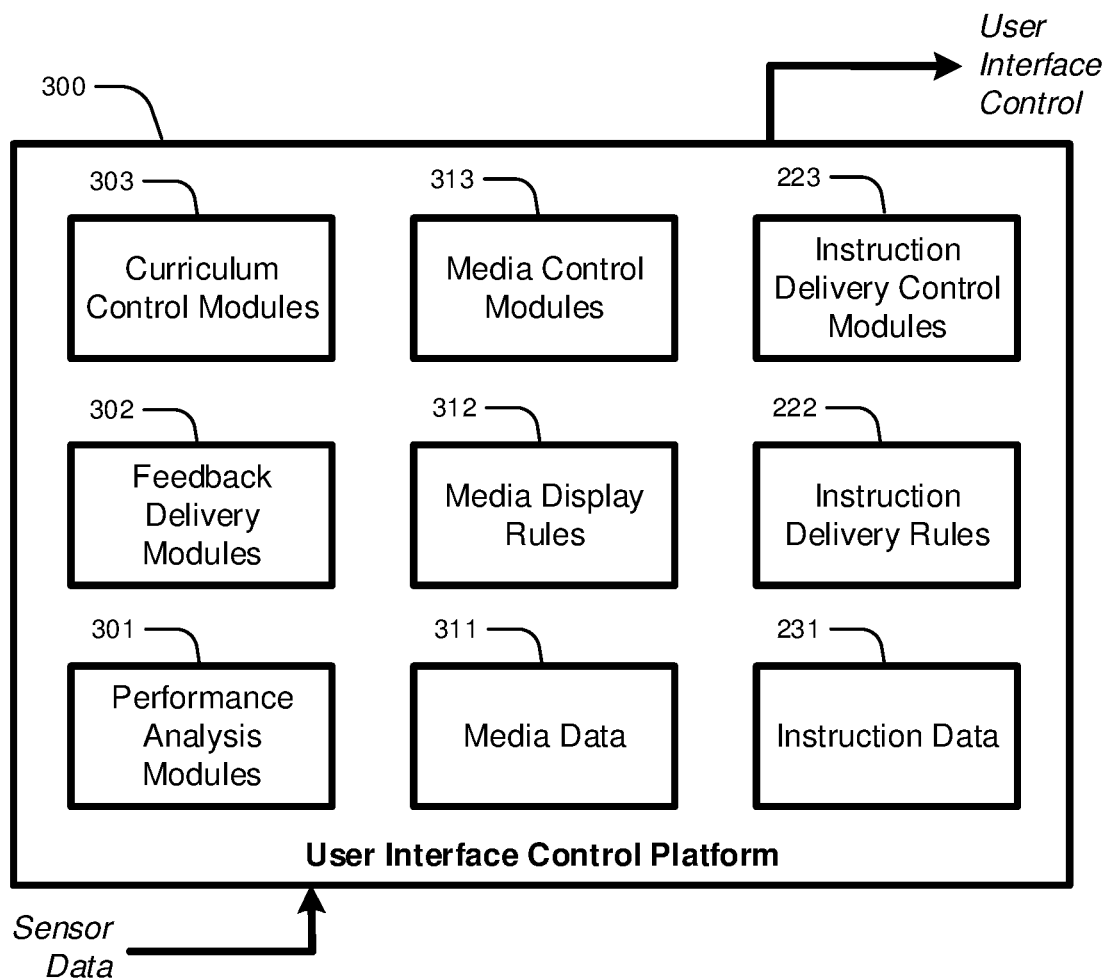
FIG. 3 functionally depicts a platform according to one embodiment.

FIG. 3 illustrates an example user interface control platform 300. This is illustrated by reference to a plurality of functionally defined components, which may in practice be provided by one or more software applications and/or data management components. The platform may execute based on software instructions executed at a single device, or across multiple devices (for example a POD device and smartphone in combination, and/or a server device).

The platform is configured to receive sensor data from one or more PSUs, or in some embodiments data derived from sensor data (for example based on a degree of pre-processing). That data is analysed by performance analysis module 301. These, for example, processor sensor data thereby to identify ODCs, and hence determine attributes of an observed physical performance such as symptoms and causes. This analysis provides input that enables driving of feedback delivery modules 302 and curriculum control modules 303, which provide logic that guides an adaptive training process (for example by providing a user with instructions and feedback in an adaptive manner in response to attributes identified in PSD).

A repository of media data 311 contains video files which are configured to be rendered in a user interface (for example a touchscreen device, retina projection display, HUD eyewear, or the like). Media display rules are responsive to modules 302 and/or 303 thereby to (i) select media to display; and (ii) determine attributes for display, such as frame rate, viewport definition, and/or viewing angle. Media control modules 313 are configured to, in response to input from application of display rules 312, provide instructions thereby to control operation of a media display object rendered in a user interface (for example by controlling frame rate, viewport, and so on).

Instruction data 231 includes data configured to enable rendering of user interface instructions, for example a scrolling ribbon object as shown in FIG. 1A. Instruction delivery rules are configured to determine a manner by which the instruction data is to be delivered, for example by determining a dynamically variable progression rate in response to analysis of PSD. Instruction delivery control modules are configured to implement those determinations, for example by dynamically controlling progress rate for an object rendered in the user interface.

Controlling Overlays

As noted, in some implementations an overlay is applied to video data. Embodiments include methods configured to enable the application of such an overlay to video data, using a predefined 3D overlay model.

Overlay model data is defined in a first orientation. For example, this orientation is defined relative to:
- In the case of music tuition, a predefined orientation and configuration of a given instrument. For example, for guitar tuition, a standardised guitar (or portion thereof, such as a fret and strings) is defined. Such a model has defined virtual points that correspond to physical instrument positional points.
- In the case of body movement tuition, a standardised 3D body model, for example a model defined based on MCD, MSD, or the like. Such a model has defined virtual points that correspond to physical body positional points.

In either case, the model is defined to provide visual information, which is able to be applied as an overlay to video data thereby to convey additional information. For instance, this visual information may show any one or more of: user positioning as derived from processing of PSD; particular regions of importance; and so on.

A method according to one embodiment includes identifying, in video data, physical positional points (such as physical instrument positional points or physical body positional points) that correspond to virtual points defined in the model. Transformations are then applied to the 3D overlay model, such that it is able to be superimposed on the video data at a correct position. In some embodiments this requires capturing and processing of MCD and/or MSD (or depth-specific data) associated with the video data, which is otherwise two-dimensional.

Conclusions and Interpretation

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A computer implemented method for adaptive delivery of skills training data, the method including:
   (i) receiving at a computing device performance data derived from one or more performance sensor units;
   (ii) processing, with the computing device, the performance data derived from the one or more performance sensor units;
   (iii) based on the processing of the data derived from the one or more performance sensor units, making a determination to vary a delivery attribute of one or more user interface components and determining a determined variation; and
   (iv) applying the determined variation in the delivery attribute of the one or more user interface components, wherein:
   processing the performance data derived from the one or more performance sensor units includes determining a performance rate;
   a given one of the user interface components includes a rendered progression object that progresses at a rate, wherein the rendered progression object progresses along a pathway that includes a plurality of performance event identification objects; and
   the performance rate is adjusted such that the rendered progression object is prevented from progressing along the pathway beyond a given one of the performance event identification objects in absence of performance data that is (i) reconciled temporally with the performance event identification object or (ii) reconciled accurately with the performance event identification object.

2. The method according to claim 1 wherein the performance rate is adjusted based upon a prediction of an anticipated time for receipt of performance data reconcilable with an upcoming performance event identification object.

3. The method according to claim 1 wherein, in response to predefined conditions, the predefined conditions including identification of performance data that is (i) reconciled temporally with the performance event identification object; and (ii) not reconciled accurately with the performance event identification object, a defined action is performed.

4. The method according to claim 3 wherein the defined action includes:
   providing a signal thereby to variation in delivery attributes of a further user interface component;
   providing feedback;
   adjusting the position of the progression object; or
   causing the progression object to enter a predefined loop, or initiating a defined sub-tutorial.

5. The method according to claim 4 wherein:
   the variation includes a view-port variation for a media object; and
   the adjusting the position of the progression object includes regressing the progression object to a defined point.

6. The method according to claim 1, wherein the received performance data includes performance data derived from one or more audio sensor units.

7. The method according to claim 1, wherein the received performance data includes performance data derived from one or more sensors configured to monitor user operation of a piece of equipment.

8. The method according to claim 7, wherein the piece of equipment includes a musical instrument.

9. The method according to claim 1, wherein the received performance data includes performance data derived from one or more motion sensor units.

10. The method according to claim 9, wherein the one or more motion sensor units are provided by a motion sensor enabled garment.

11. The method according to claim 9, wherein processing the performance data derived from the one or more motion sensor units includes identifying characteristics of simultaneous motions of individual motion sensors.

12. The method according to claim 1, wherein processing the performance data derived from the one or more performance sensor units includes identifying presence of one or more predefined observable data conditions and one of the predefined observable data conditions is associated with a symptom.

13. The method according to claim 12, wherein the processing further includes determining a cause associated with the symptom by analysis of the data derived from the one or more performance sensor units thereby to identify presence of one or more further observable data conditions.

14. The method according to claim 1, wherein one or more of the user interface components includes a rate attribute, and wherein making a determination to vary a delivery attribute of one or more user interface components includes setting the rate attribute based on the determined performance rate.

15. The method according to claim 1, wherein the performance rate is a predictive performance rate, wherein the predictive performance is continuously varied responsive to validation of predictions.

16. A computer implemented method for adaptive delivery of skills training data, the method including:
   (i) receiving at a computing device performance data derived from one or more performance sensor units;
   (ii) processing, with the computing device, the performance data derived from the one or more performance sensor units;
   (iii) based on the processing of the data derived from the one or more performance sensor units, making a determination to vary a delivery attribute of one or more user interface components and determining a determined variation; and
   (iv) applying the determined variation in the delivery attribute of the one or more user interface components, wherein:
   a given one of the user interface components includes a rendered progression object that progresses at a rate, wherein the rendered progression object progresses along a pathway that includes a plurality of performance event identification objects; and
   making a determination to vary a delivery attribute of one or more of the user interface components includes adjusting the rate such that the rendered progression object is prevented from progressing along the pathway beyond a given one of the performance event identification objects in absence of performance data that is (i) reconciled temporally with the performance event identification object; or (ii) reconciled accurately with the performance event identification object.

17. The method according to claim 16 wherein the performance rate is adjusted based upon a prediction of an anticipated time for receipt of performance data reconcilable with an upcoming performance event identification object.

18. The method according to claim 16 wherein, in response to predefined conditions, the predefined conditions including identification of performance data that is (i) reconciled temporally with the performance event identification object; and (ii) not reconciled accurately with the performance event identification object, a defined action is performed.

19. The method according to claim 18 wherein the defined action includes:
   providing a signal thereby to variation in delivery attributes of a further user interface component;
   providing feedback;
   adjusting the position of the progression object;
   causing the progression object to enter a predefined loop; or
   initiating a defined sub-tutorial.

20. The method according to claim 19 wherein:
   the variation includes a view-port variation for a media object; and
   adjusting the position of the progression object includes regressing the progression object to a defined point.

21. The method according to claim 16, wherein:
   a given one of the user interface components includes a media object that has a viewport definition; and
   making a determination to vary a delivery attribute of one or more user interface components further includes making a determination to adjust the viewport definition.

22. A computer implemented method for adaptive delivery of skills training data, the method including:
   (i) receiving at a computing device performance data derived from one or more performance sensor units;
   (ii) processing, with the computing device, the performance data derived from the one or more performance sensor units;
   (iii) based on the processing of the data derived from the one or more performance sensor units, making a determination to vary a delivery attribute of one or more user interface components and determining a determined variation; and
   (iv) applying the determined variation in the delivery attribute of the one or more user interface components, wherein:
   a given one of the user interface components includes a media object that has a viewport definition;
   making a determination to vary the delivery attribute of one or more user interface components includes making a determination to adjust the viewport definition;
   the viewport definition is adjusted in response to a determination of accuracy derived from processing of the performance data or identification of one or more observable data conditions in the performance data; and
   a viewport definition adjustment includes a digital pan, zoom operation, or angle adjustment.

23. The computer implemented method according to claim 22 wherein a set of rules are defined, the rules associating observable data conditions and viewport definition adjustments.

* * * * *